United States Patent
Edwards

[15] 3,703,745
[45] Nov. 28, 1972

[54] METHOD FOR PREPARING ANIMALS FOR SLAUGHTER

[72] Inventor: Everett Edwards, 1519 Deerwood Drive, South St. Paul, Minn. 55015

[22] Filed: Jan. 15, 1971

[21] Appl. No.: 106,699

Related U.S. Application Data

[62] Division of Ser. No. 764,773, Oct. 3, 1968, Pat. No. 3,599,276.

[52] U.S. Cl............................................17/45, 17/1 A
[51] Int. Cl..............................................A22b 5/02
[58] Field of Search................................17/1, 1 A, 45

[56] References Cited

UNITED STATES PATENTS

| 3,113,340 | 12/1963 | Bush et al. .................. 17/1 A |
| 252,112 | 1/1882 | Lowry et al. .................. 17/1 R |
| 1,021,523 | 3/1912 | Hoeckelberg.................. 17/1 A |
| 712,579 | 11/1902 | Nicholson et al. ............. 17/1 A |

Primary Examiner—Lucie H. Laudenslager
Attorney—Carl C. Batz and Frank T. Barber

[57] ABSTRACT

A method for preparing meat animals for slaughter in which the animals are confined in an elevated bottomless pen, stunned and shackled while in the pen, and discharged directly to a conveyor rail for slaughter.

3 Claims, 3 Drawing Figures

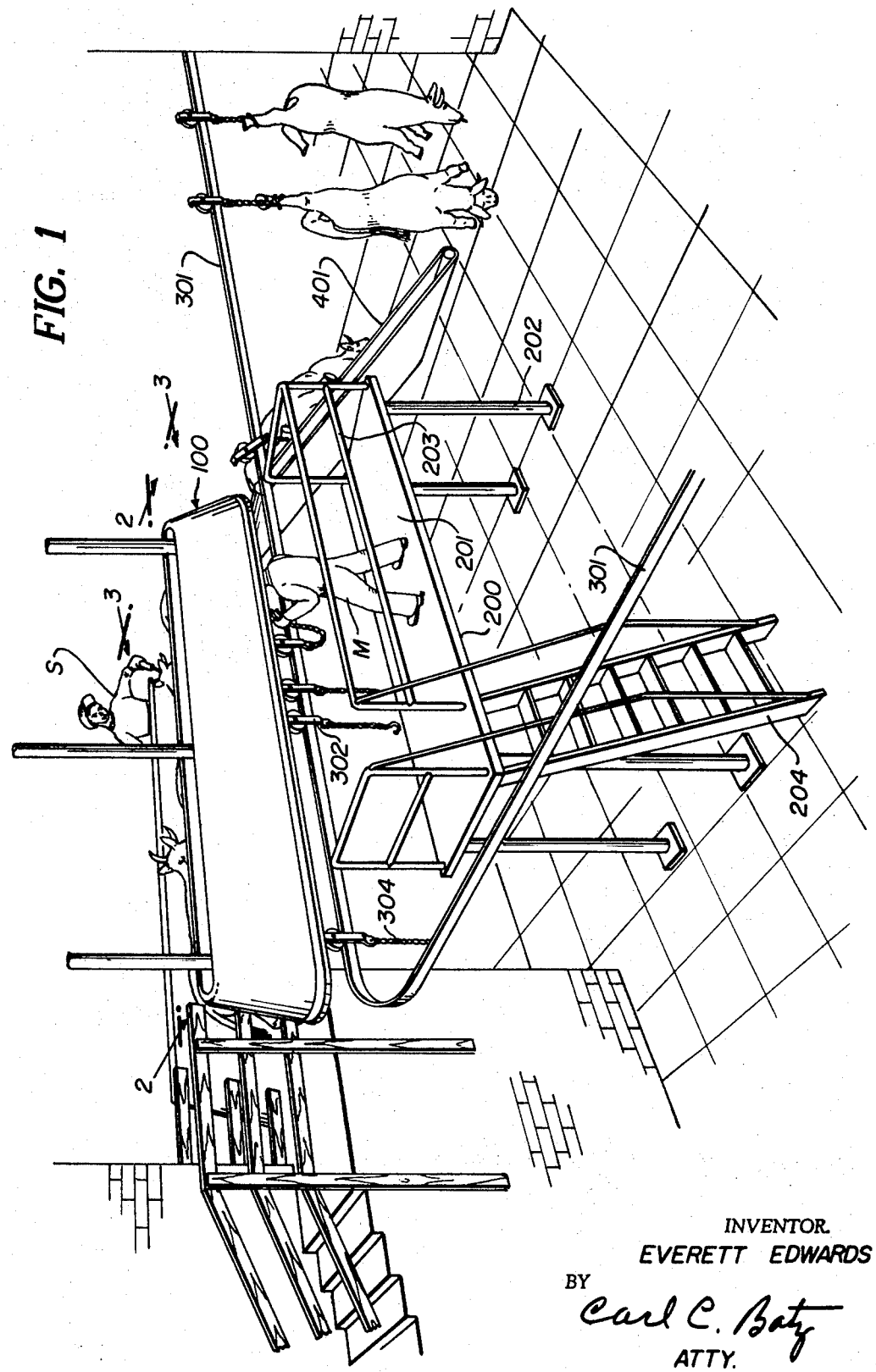

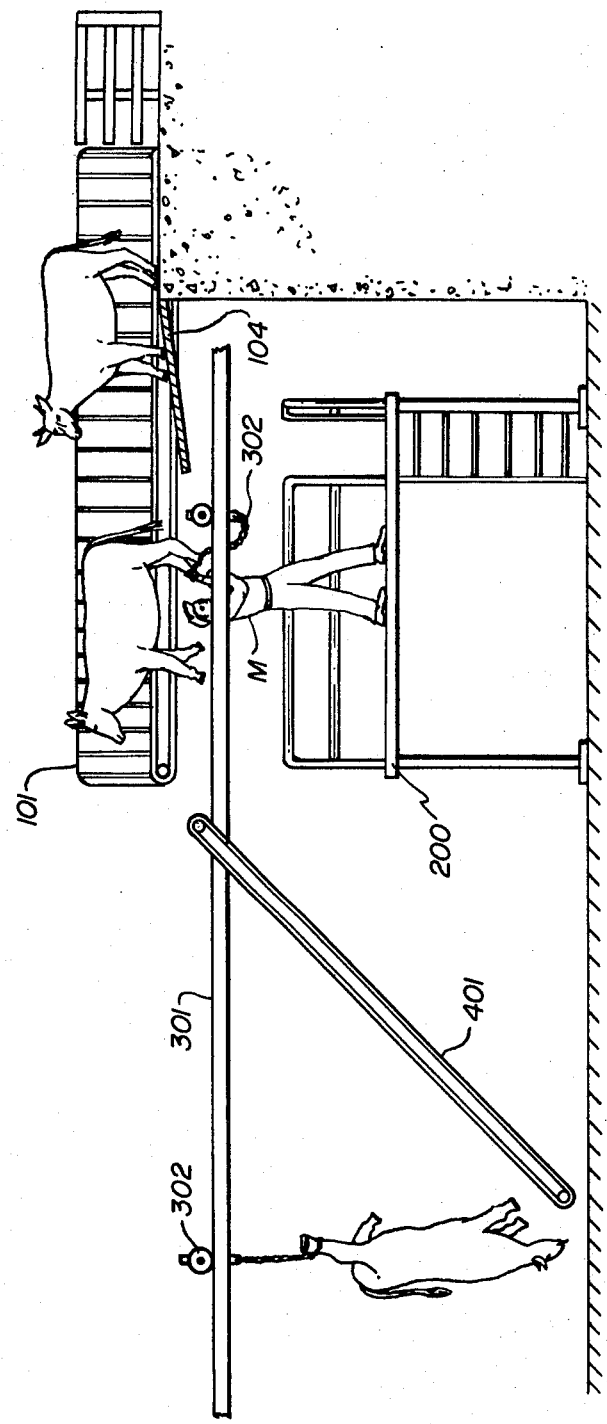

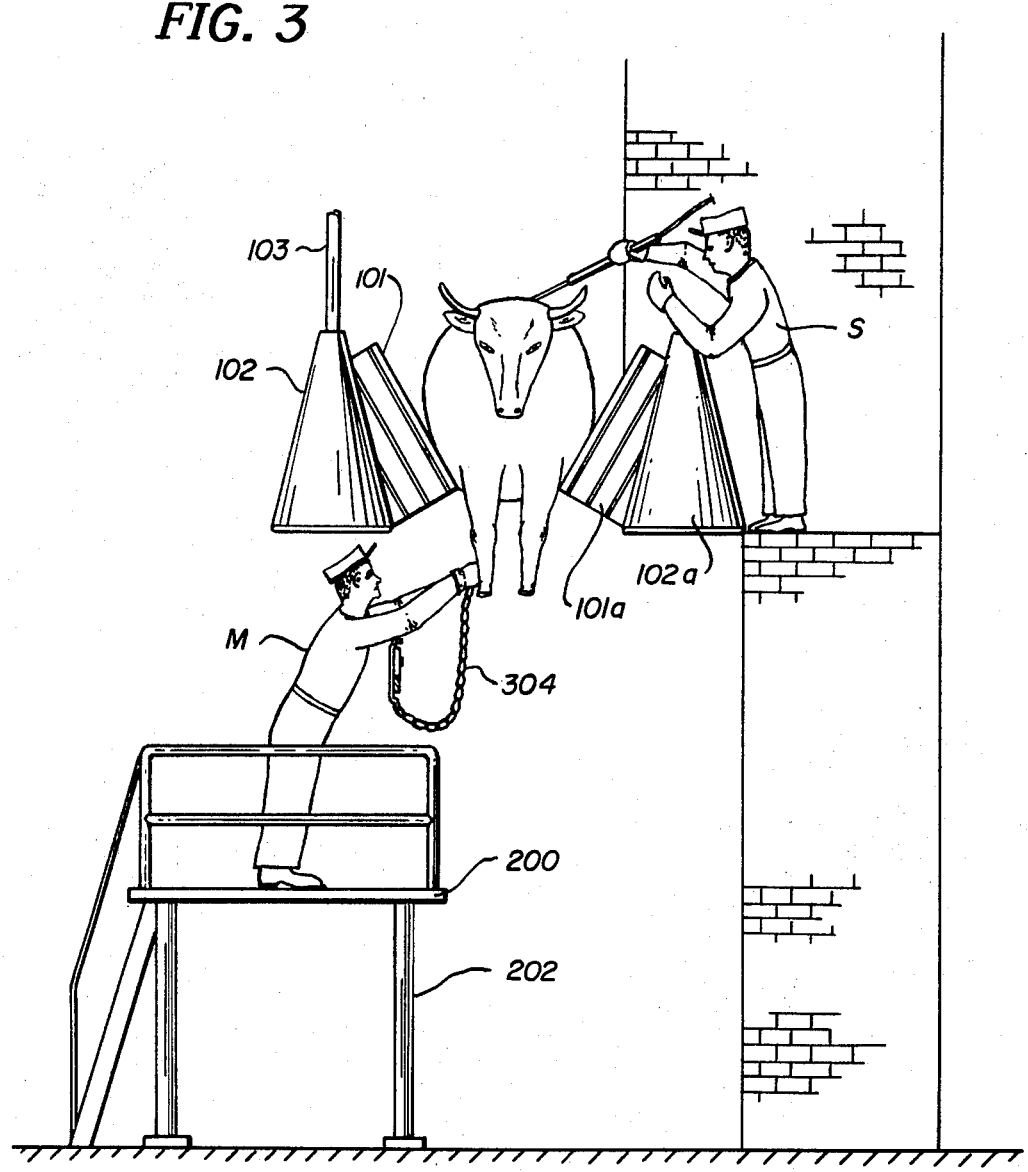

METHOD FOR PREPARING ANIMALS FOR SLAUGHTER

CROSS REFERENCE TO RELATED APPLICATIONS

This application is a division application of my copending application entitled "Apparatus and Method for Preparing Animals for Slaughter" Ser. No. 764,773, filed Oct. 3, 1968, now U.S. Pat. No. 3,599,276, issued Aug. 17, 1971.

BACKGROUND OF THE INVENTION

The methods used in the slaughter of meat animals have remained essentially unchanged for many years. Basically the procedure entails stunning the animal by a blow to the head, and then either severing a major artery in the neck and hoisting the animal to a head-down hanging position, or first hoisting the animal to a hanging position and then severing the artery, in order to produce death by bleeding.

The advent of federal standards for the humane slaughter of meat animals gave rise to some modifications of this procedure. Namely, improved methods of stunning were developed, including stunning devices operated with explosive charges, and the development of electrical stunning. Additionally, various stunning pens or "knocking boxes" were developed. These pens are used to confine one or more animals during the stunning operation in order to restrict movement of the animals allowing the stunner to operate more accurately. After the animals are stunned, they are discharged from the pen onto the floor where they are shackled and hoisted to a dressing rail for further processing.

Procedures of the general nature described have been in wide use in the meat industry for many years, particularly in the slaughter of beef cattle, and these procedures have a variety of inherent disadvantages.

Since the procedures are almost entirely manual, they involve considerable labor costs, especially when a large number of animals are processed on a continuous basis. Moreover, the equipment used such as stunning pens, stunners, and hoists receive fairly rough usage, incurring considerable maintenance expense. The system does not easily lend itself to proper lot control when large numbers of animals are processed.

Another very significant problem is that of safety. Because the stunning pens only restrict the movement of the animals without immobilizing them, it is difficult for the operator to insure that the animal is completely and accurately stunned, and even after stunning, many animals continue to demonstrate rather violent kicking movements. This, of course, is extremely dangerous to the shacklers, moving about groups of such animals attempting to secure a shackle to the feet of the animals. There is also a tendency for the animals to be bruised in falling in the stunning pen and in kicking one another. Bruising of course either renders the meat obtained unusable or greatly reduces its value.

It is an object of the present invention therefore to provide a safer method for stunning and shackling meat animals for slaughter.

It is also an object of the present invention to provide a method for stunning and shackling animals which will significantly reduce bruise damage to animals.

A further object of the invention is to provide a method for stunning and shackling animals in which equipment requiring a minimum of maintenance can be used.

A still further object of the invention is to provide a method for stunning and shackling animals which will require a minimum of manual labor and reduce labor costs.

Further objects and advantages of the invention will become apparent as the description proceeds.

According to the present invention animals to be slaughtered are introduced between a pair of elevated cooperating conveyors longitudinally spaced apart in a V-forming relationship, the animal being supported by the conveyors and the legs of the animal hanging free in the space between the conveyors. While in this configuration, the animal is stunned and at least one leg is shackled from beneath the conveyors. The shackle is attached to a rail mounted essentially parallel to the conveyors. After stunning and shackling, the animal is discharged onto a downwardly sloped ramp. The elevated position of the conveyors and their relationship to the rail is such that the stunned animal becomes suspended from the rail as it is discharged from the conveyors.

One embodiment of the invention will be more particularly described by reference to the accompanying drawings in which:

FIG. 1 is a perspective view of the apparatus,

FIG. 2 is a partial section view taken along line 2—2 in FIG. 1, and,

FIG. 3 is a partial section view taken along line 3—3 in FIG. 1

In the drawings, 100 designates a restraining pen. Pen 100 is generally comprised of endless conveyors 101 and 101a, guard portions 102 and 102a, support means 103, and entrance ramp 104.

Conveyors 101 and 101a are arranged in parallel spaced apart relationship, each conveyor sloping downwardly and inwardly to form an open V. The distance between the conveyors is adjusted to securely hold an animal to be stunned and shackled, allowing the feet and legs of the animal to hang freely below the conveyors. This distance can be varied according to the type and size of the animals to be processed. Conveyors 101 and 101a can be driven by conventional power and gearing means known in the mechanical arts.

The conveyor surfaces can be manufactured of or covered with materials which will not cause splinters or otherwise cause pain to the animals so restrained, such as smooth metal, hard rubber, or the like.

Conveyors 101 and 101a are partially shielded by guard portions 102 and 102a, which portions can function both as a protective guard for personnel working in the area of the apparatus, and as a supportive housing for the conveyors and conveyor driving mechanism. Guard portions 102 and 102a allow conveyors 101 and 101a to be substantially enclosed except for the innermost surfaces thereof.

Support members 103 are provided in order to fix the position of conveyor 101 substantially above the floor level of the slaughtering room. The support members can be attached to the ceiling, as indicated in the drawings or can be floor mounted stanchions similar to platform supports 202. It will also be understood that although conveyor 101a and guard portion 102a are depicted fastened to a vertical wall, the invention is not limited thereby and encompasses an installation wherein conveyor 101a and guard portion 102a are supported by support members in the same manner as conveyor 101 and guard portion 102.

Entrance ramp 104 is provided at the input end of restraining pen 100 and subjacent conveyors 101 and 101a, sloped downwardly as it progresses along the length of restraining pen 100, and reaches the lowermost point of its terminal end. The ramp extends between conveyors 101 and 101a for a sufficient distance to allow an animal to gradually lower itself between the conveyors until at the terminal end of the ramp the weight of the animal is completely supported in an upright position by the conveyors.

Transporting means 301 is provided suitably near restraining pen 100. In operation, stunned animals and slaughtered animals are suspended from transporting means 301 in order to be carried from one station to another where the various slaughtering and butchering steps are performed. Transporting means 301 may comprise a rail having a drive chain mechanism coextensive therewith. Shackle means 302 is adapted for movement along transporting means 301. The shackle means preferably comprises trolley portion 303 having a chain portion 304 attached thereto. Trolley portion 303 may be operably engaged with the rail for movement therealong urged by the drive chain mechanism. Chain portion 304 is adapted to be secured about the leg of an animal to be transported.

Transporting means 301 should be located sufficiently near restraining pen 100 to allow shackle means 302 to act as a connector between the animal in the pen 100 and transporting means 301. That is, transporting means 301 should be positioned near pen 100 so that trolley portion 303 of the shackle can be operably engaged with transporting means 301 at the same time that chain portion 304 of the shackle is secured about the leg of an animal in pen 100. It can also be seen that the acceptable distance between transporting means 301 and pen 100 might be increased by increasing the length of chain portion 304. However this flexibility is limited by practical considerations in that it is desirable that the animal not touch the floor when suspended from transporting means 301, and the acceptable length of chain portion 304 is limited thereby.

It is preferred that transporting means 301 be fixed essentially parallel to the longitudinal axis of pen 100 as this configuration provides easy access by the operator to the various parts of the apparatus, and allows the use of fairly simple mechanisms to transfer the animals to a depending position from transporting means 301 upon release of the animals from pen 100.

In order to provide working access to the shackle means 302 and the animals in the pen 100, operator's platform 200 is provided, consisting of flat portion 201, supported by platform supports 202, said flat portion being surrounded by guard rail means 203. Platform 200 is positioned at a suitable height above the floor to allow a worker standing thereon to have ready access to the rail 301, shackle means 302 and the legs of the animals in pen 100. Access to the platform may be provided by stairs 204.

Downwardly inclined ramp 401 may be provided at the discharge end of pen 100 to receive the stunned and shackled animals. Ramp 401 can if desired be a stationary slide constructed of a material with a relatively low coefficient of sliding friction and inclined downwardly at a sufficiently steep angle to allow the stunned animals to easily slide down the ramp. However, it is preferred that ramp 401 be an endless driven conveyor, thereby allowing for positively carrying the stunned animals from the discharge end of the pen 100 to a hanging position from the transporting means. Preferably the speed of the conveyor forming ramp 401 is synchronized to the speed of the drive chain of the transporting means. In this manner, the shackle means 302 attached to the leg of an animal moves along at a speed compatible with the speed which the animal travels down ramp 401, thereby allowing for a smooth and gentle transfer of the animal from ramp 401 to a depending position from the transporting means.

OPERATION

The present invention is designed to facilitate the preparation of meat animals for slaughter, specifically for use in the preliminary steps of stunning and shackling the animals prior to their actually being killed. This method is particularly adapted to a volume operation in which a large number of animals are slaughtered on a continuous basis, such as in a meat packing plant.

In operation, the animals are driven into the input end of pen 100 from their staging or holding area. The holding area can be located at the same level as the pen 100 and the animals driven directly from the holding area to the pen. If it is not practical to locate the holding area at the pen level, the animals can be driven and guided upwardly or downwardly from the holding area to the pen by the use of conventional chutes and conveyors.

As the animal enters pen 100, conveyors 101 and 101a contact the sides of the animal and aid in urging the animal along entrance ramp 104. As the animal progresses along ramp 104, the downward slope of the ramp gradually causes the sides of the animal to come into increasingly intimate contact with conveyors 101 and 101a, until at the terminal end of ramp 104 the animal is completely supported by the conveyors. At this point the animal is effectively immobilized in an upright position within the pen.

Conveyors 101 and 101a carry the animal along pen 100 in an upright position. As soon as the animal has become immobilized in the pen, the stunner S, stuns the animal using conventional stunning methods and equipment. Such equipment may include air-driven stunning devices, or various electrical devices. It can be seen that the stunner operator can work with increased accuracy over the conventional "knocking box" methods because the animal is more completely immobilized in the pen, is positioned favorably for the stunner operator, and the animal is free from the jostling of other animals in the area.

When the animal has been rendered unconscious by the stunner operator, it assumes a rather limp hanging position within the pen, continuing to be supported in an upright position by conveyors 101 and 101a. At this point the shackle operator, M, positioned on platform 200, can easily attach chain portion 304 of a shackle means 302 to one leg of the animal. Due to the construction of the pen 100 in an open V configuration and the unique physical relationship between the pen 100, the transporting means 301, the shackle means 302, and the animal, the shackle operator has ready access to the shackle means, the transporting means, and the legs of the animal as shown best in FIGS. 2 and 3.

At this point in the operation the animal has been stunned and shackled and is still safely confined in the pen. The animal travels the short remaining distance to the discharge end of the pen, and is preferably discharged by action of conveyors 101 and 101a onto ramp 401. It can be seen that the animal can be discharged from pen 100 without the provision of ramp 401. In that instance however, the animal falls upon release from the pen until the fall is halted by the full extension of chain portion 304 of shackle means 302. This type of action tends to be rather abrupt and may produce injury and damage to the animal. This possibility can be remedied by the addition of ramp 401. Accordingly, ramp 401 is designed and positioned to allow the transfer of the stunned animal from the restraining pen 100 to the transporting means 301 in a more safe and humane manner.

As the stunned animal continues down ramp 401, the chain portion 304 of shackle means 302 extends until it is finally fully extended. Shackle means 302 is continuously urged along by the transporting means. As the shackle moves along the transporting means, the animal is lifted from ramp 401 and into a depending position from transporting means 301. At that time the animal is fully prepared for slaughter by an conventional slaughtering technique.

While undoubtedly many advantages of the present method have become apparent from the foregoing description of the preferred embodiments, certain primary advantages should be specifically pointed out. The method of the invention should allow for realization of significant savings of labor costs in a reasonably large slaughtering plant as the invention requires less men to perform the various driving, stunning and shackling operations as are required to perform these functions with conventional equipment and methods.

Further, a reduction in procurement and maintenance costs should be realized after initial installation as the knocking boxes and landing hoists are eliminated, which are often the source of costly maintenance expenses.

The present invention lends itself to more simple and positive lot control of animals to be processed. This in turn would make it practical for large slaughter and packing operators to procure and process small lots as well as large lots, a practice generally considered impractical with existing equipment.

The use of the present invention avoids the primary causes of cattle bruises in the stunning and shackling area, thereby producing a larger yield of saleable meat.

Moreover, this method allows for safer handling of the animals. Safety can be a significant problem in the stunning and shackling area, especially when large beef cattle are being processed. Because the cattle are restrained or immobilized throughout the process, the safety hazards attendant to conventional methods are substantially reduced. Also, because the animal is effectively immobilized while in the pen, the stunner operator can work more rapidly and more accurately than when stunning animals in knocking boxes.

While in the foregoing specification considerable detail has been set out for purposes of illustration and complete description of certain preferred embodiments, it will be understood that the invention is not limited thereby, and that numerous variations can be made by those skilled in the art without departing from the spirit or scope of the invention.

What is claimed is:

1. A method of preparing meat animals for slaughter comprising moving an animal in an upright position through an enclosure while supporting said animal by the sides of said enclosure and permitting the legs of said animal to extend below said enclosure, stunning said animal and shackling at least one leg of said animal below said enclosure while said animal is so positioned.

2. A method as set forth in claim 1 which includes the step of releasing said animal after being shackled from said enclosure to assume a depending position for slaughter.

3. A method as set forth in claim 1 which includes the step of passing said animal downwardly on an inclined support to said depending position.

* * * * *